United States Patent
Nobukawa

(10) Patent No.: US 9,163,540 B2
(45) Date of Patent: Oct. 20, 2015

(54) EXHAUST GAS CONTROL APPARATUS FOR INTERNAL COMBUSTION ENGINE

(71) Applicant: Takeshi Nobukawa, Susono (JP)

(72) Inventor: Takeshi Nobukawa, Susono (JP)

(73) Assignee: TOYOTA JIDOSHA KABUSHIKI KAISHA, Tyota-shi (JP)

(*) Notice: Subject to any disclaimer, the term of this patent is extended or adjusted under 35 U.S.C. 154(b) by 0 days.

(21) Appl. No.: 14/347,860

(22) PCT Filed: Sep. 17, 2012

(86) PCT No.: PCT/IB2012/001804
§ 371 (c)(1),
(2) Date: Mar. 27, 2014

(87) PCT Pub. No.: WO2013/045990
PCT Pub. Date: Apr. 4, 2013

(65) Prior Publication Data
US 2014/0230416 A1  Aug. 21, 2014

(30) Foreign Application Priority Data
Sep. 27, 2011 (JP) .................. 2011-210426

(51) Int. Cl.
*F01N 3/00* (2006.01)
*F01N 3/10* (2006.01)
(Continued)

(52) U.S. Cl.
CPC *F01N 3/18* (2013.01); *F01N 3/103* (2013.01); *F01N 3/225* (2013.01); *F01N 3/323* (2013.01);
(Continued)

(58) Field of Classification Search
CPC ........... F01N 3/103; F01N 3/18; F01N 3/225; F01N 3/323; F01N 9/00; F01N 13/02; F01N 2900/1602; Y02T 10/20; Y02T 10/47

USPC ............... 60/276, 285, 289, 299, 301
See application file for complete search history.

(56) References Cited

U.S. PATENT DOCUMENTS 4,134,262 A * 1/1979 Sugihara et al. ............... 60/289
4,231,220 A * 11/1980 Takeda ........................ 60/276
(Continued)

FOREIGN PATENT DOCUMENTS

EP  1 277 930  1/2003
EP  2072774 A1 * 6/2009 ............. F01N 3/035
(Continued)

OTHER PUBLICATIONS

Amblard, M. et al. "The selective conversion of ammonia to nitrogen on metal oxide catalysts under strongly oxidising conditions" Elsevier, Applied Catalysts B: Environmental, vol. 22, pp. L159-L166, 1999.
(Continued)

*Primary Examiner* — Audrey K Bradley
(74) *Attorney, Agent, or Firm* — Oblon, McClelland, Maier & Neustadt, L.L.P.

(57) ABSTRACT

An exhaust gas control apparatus for an internal combustion engine includes a NOx purification catalyst disposed in an exhaust passage of the internal combustion engine and carrying a first catalyst metal on a first catalyst carrier, an oxidation catalyst disposed in the downstream exhaust passage of the NOx purification catalyst and carrying second catalyst metals including a base metal on a second catalyst carrier, an air introduction apparatus introducing air into an upstream of the oxidation catalyst, and a temperature detector detecting a temperature of the oxidation catalyst. When an oxidation catalyst temperature is a predetermined temperature or lower, an air-fuel ratio of the exhaust gas into the oxidation catalyst is controlled to a more fuel lean ratio than the stoichiometric air-fuel ratio. When the oxidation catalyst temperature exceeds the predetermined temperature, the air-fuel ratio of the exhaust gas into the oxidation catalyst is controlled to the stoichiometric air-fuel ratio.

12 Claims, 3 Drawing Sheets

(51) Int. Cl.
*F01N 3/18* (2006.01)
*F01N 3/22* (2006.01)
*F01N 3/32* (2006.01)
*F01N 9/00* (2006.01)
*F01N 13/02* (2010.01)

(52) U.S. Cl.
CPC *F01N 9/00* (2013.01); *F01N 13/02* (2013.01); *F01N 2900/1602* (2013.01); *Y02T 10/20* (2013.01); *Y02T 10/47* (2013.01)

(56) References Cited

U.S. PATENT DOCUMENTS

| | | | |
|---|---|---|---|
| 5,783,160 | A | 7/1998 | Kinugasa et al. |
| 5,804,147 | A * | 9/1998 | Blanchet et al. ............... 422/171 |
| 6,446,431 | B1 * | 9/2002 | Bruck ............................ 60/289 |
| 2006/0150617 | A1 * | 7/2006 | Nishimura et al. ............. 60/289 |
| 2013/0287640 | A1 | 10/2013 | Watanabe et al. |

FOREIGN PATENT DOCUMENTS

| | | |
|---|---|---|
| JP | 9 173782 | 7/1997 |
| JP | 10 85557 | 4/1998 |
| JP | 2003 239786 | 8/2003 |
| JP | 2006 289211 | 10/2006 |
| JP | 2008 309013 | 12/2008 |
| JP | 2012 159075 | 8/2012 |

OTHER PUBLICATIONS

Liu, F. et al., "Structure-Activity Relationship of Iron Titanate Catalysts in the Selective Catalytic Reduction of $NO_x$ with $NH^3$" J. Phys. Chem. vol. 114, No. 40, pp. 16929-16936, 2010.

International Search Report Issued Dec. 19, 2012 in PCT/IB12/001804 Filed Sep. 17, 2012.

* cited by examiner

EXHAUST GAS CONTROL APPARATUS FOR INTERNAL COMBUSTION ENGINE

BACKGROUND OF THE INVENTION

1. Field of the Invention

The present invention relates to an exhaust gas control apparatus for an internal combustion engine and particularly to an exhaust gas control apparatus for an internal combustion engine that includes a nitrogen oxide (NOx) purification catalyst and an oxidation catalyst.

2. Description of Related Art

A technology for purifying exhaust gas from an internal combustion engine such as a gasoline engine or a diesel engine has been known that uses a NOx purification catalyst. However, use of noble metals in general used as catalyst components of the NOx purification catalyst, for example, platinum group metals such as rhodium (Rh) has been increasing accompanying reinforcement of regulation of automobile exhaust gas. Therefore, there has been a concern about the depletion of the resources. Accordingly, it is required that the amount of the platinum group metals used be reduced and such a function of the platinum group metals be provided by other metals instead.

Japanese Patent Application No. 2008-309013 (JP 2008-309013 A) discloses an exhaust gas control apparatus for an internal combustion engine that includes a fundamental structure having a first stage base metal catalyst which partially oxidizes mainly hydrocarbons (HC) and produces carbon monoxide (CO) and a second stage base metal catalyst which reduces and purifies NOx. Further, a preferable mode is disclosed such that an exhaust gas at an air-fuel ratio which is slightly more fuel rich than the stoichiometric air-fuel ratio is caused to flow into the first stage base metal catalyst, a third stage base metal catalyst which oxidizes and purifies HC and CO is provided on a downstream side of the fundamental structure, and air is introduced into the exhaust gas flowing into the third base metal catalyst by an air introduction apparatus provided between the fundamental structure and the third base metal catalyst. JP 2008-309013 A describes that iron (Fe) can be used as a catalyst component of the second base metal catalyst which reduces and purifies NOx. Further, JP 2008-309013 A describes that an exhaust gas control apparatus having an above configuration facilitates the reduction and purification of NOx by the CO—NO reaction in the second base metal catalyst, and residual CO and HC in the exhaust gas are oxidized and purified in the third base metal catalyst.

Here, in the exhaust gas control apparatus disclosed in JP 2008-309013 A, base metals such as iron (Fe) used as catalyst components have low reduction abilities compared to platinum group metals such as rhodium (Rh), in an atmosphere which has excess oxygen compared to the stoichiometric air-fuel ratio such as a fuel lean atmosphere, or an atmosphere around the stoichiometric air-fuel ratio. Accordingly, when the air-fuel ratio of the exhaust gas is a fuel lean ratio or the stoichiometric air-fuel ratio, NOx contained in the exhaust gas cannot be sufficiently reduced and purified. Hence, for example, when base metals are used as catalyst metals for the NOx purification catalyst, it is in general preferably that the air-fuel ratio of the exhaust gas flowing into the NOx purification catalyst is controlled to a more fuel rich air-fuel ratio than the stoichiometric air-fuel ratio as described in JP 2008-309013 A. However, at such a fuel rich ratio, in other words, in a reducing atmosphere, for example, nitrogen ($N_2$) contained in the exhaust gas is reduced by HC or the like, and ammonia ($NH_3$) may thereby be produced.

Japanese Patent Application Publication No. 2006-289211 (JP 2006-289211 A) and Japanese Patent Application Publication No. 10-085557 (JP 10-085557 A) discloses catalysts and methods for oxidizing and decomposing ammonia contained in the exhaust gas.

For example, an ammonia oxidation catalyst disclosed in Japanese Patent Application Publication No. 2006-289211 (JP 2006-289211 A) prevents the production of nitrous oxide ($N_2O$) from $NH_3$ and oxidizes $NH_3$ to nitric oxide (NO). Accordingly, the ammonia oxidation catalyst disclosed in JP 2006-289211 A does not oxidize and decompose $NH_3$ to nitrogen ($N_2$) and water ($H_2O$) that are harmless. Meanwhile, an exhaust gas control method for purifying an exhaust gas containing ammonia which is disclosed in Japanese Patent Application Publication No. 10-085557 (JP 10-085557 A) is to purify exhaust gases from chemical plants but not to purify an exhaust gas from an internal combustion engine. An exhaust gas control method for purifying an exhaust gas containing ammonia which is disclosed in JP 10-085557 A requires two reactors that are a pre-stage reactor and a post-stage reactor each filled with a catalyst for purifying ammonia. Therefore, in view of cost, installation space, and the like, it is difficult to apply the method disclosed in JP 10-085557 A to an exhaust gas control apparatus for an internal combustion engine.

SUMMARY OF THE INVENTION

Accordingly, an object of the present invention is to provide an exhaust gas control apparatus for an internal combustion engine that can reduce and purify NOx discharged from an internal combustion engine and can purify $NH_3$ contained in an exhaust gas to harmless $N_2$.

An aspect of the present invention provides an exhaust gas control apparatus for an internal combustion engine includes: a NOx purification catalyst which is disposed in an exhaust passage of the internal combustion engine and is formed to carry a first catalyst metal on a first catalyst carrier; an oxidation catalyst which is disposed downstream of the NOx purification catalyst in the exhaust passage and is formed to carry second catalyst metals including a base metal on a second catalyst carrier; an air introduction apparatus that introduces air into the exhaust passage downstream of the NOx purification catalyst in the exhaust passage and upstream of the oxidation catalyst in the exhaust passage; a temperature detector that detects a temperature of the oxidation catalyst. In the exhaust gas control apparatus; and a controller that, when the temperature of the oxidation catalyst detected by the temperature detector is a predetermined temperature or lower, adjusts an air amount introduced into the exhaust passage by the air introduction apparatus to control an air-fuel ratio of the exhaust gas flowing into the oxidation catalyst to a more fuel lean air-fuel ratio than a stoichiometric air-fuel ratio, and, when the temperature of the oxidation catalyst detected by the temperature detector exceeds the predetermined temperature, adjusts the air amount introduced into the exhaust passage by the air introduction apparatus to control the air-fuel ratio of the exhaust gas flowing into the oxidation catalyst to the stoichiometric air-fuel ratio.

In the exhaust gas control apparatus for an internal combustion engine in accordance with an aspect of the present invention, the base metal may be selected from the group consisting of Cu, Fe, Ni, Cr, Ce, Co, Mg, Zn, and combinations thereof.

In the exhaust gas control apparatus for an internal combustion engine in accordance with an aspect of the present invention, the base metal may be selected from the group consisting of Cu, Fe, and a combination thereof.

In the exhaust gas control apparatus for an internal combustion engine in accordance with an aspect of the present invention, the oxidation catalyst may be formed with a pre-stage section in an upstream side in a flow direction of the exhaust gas and a post-stage section in a downstream side in the flow direction of the exhaust gas, the second catalyst metals may further include at least one of Pt, Pd, and Ag, the base metal may be carried on both of the pre-stage section and the post-stage section, and at least one of Pt, Pd, and Ag is carried only on the post-stage section.

In the exhaust gas control apparatus for an internal combustion engine in accordance with the aspect of the present invention, the second catalyst carrier may be selected from the group consisting of alumina, zeolite, titania and combinations thereof.

In the exhaust gas control apparatus for an internal combustion engine in accordance with an aspect of the present invention, the first catalyst metal may be selected from the group consisting of Cu, Fe, Ni, Mn, Pt, Pd, Rh, Au, and combinations thereof.

In the exhaust gas control apparatus for an internal combustion engine in accordance with an aspect of the present invention, the first catalyst metal may be Cu.

The exhaust gas control apparatus for an internal combustion engine in accordance with an aspect of the present invention may further include an oxygen sensor disposed downstream of the oxidation catalyst in the exhaust passage, in which the air amount introduced into the exhaust passage by the air introduction apparatus is adjusted according to an output value of the oxygen sensor to control the air-fuel ratio of the exhaust gas flowing into the oxidation catalyst.

The exhaust gas control apparatus for an internal combustion engine in accordance with an aspect of the present invention may further include an air-fuel ratio sensor disposed downstream of the oxidation catalyst in the exhaust passage, in which the air amount introduced into the exhaust passage by the air introduction apparatus is adjusted according to an output value of the air-fuel ratio sensor to control the air-fuel ratio of the exhaust gas flowing into the oxidation catalyst.

In the exhaust gas control apparatus for an internal combustion engine in accordance with an aspect of the present invention, the predetermined temperature may be 350° C.

In the exhaust gas control apparatus for an internal combustion engine in accordance with an aspect, of the present invention, the air-fuel ratio of the exhaust gas flowing into the NOx purification catalyst may be a more fuel rich air-fuel ratio than the stoichiometric air-fuel ratio.

In the exhaust gas control apparatus for an internal combustion engine in accordance with an aspect of the present invention, the air-fuel ratio of the exhaust gas flowing into the NOx purification catalyst may be alternated between a more fuel rich air-fuel ratio than the stoichiometric air-fuel ratio and a more fuel lean air-fuel ratio than the stoichiometric air-fuel ratio.

According to the exhaust gas control apparatus for an internal combustion engine of the present invention, the air-fuel ratio of the exhaust gas flowing into the oxidation catalyst is appropriately controlled in response to the temperature of the oxidation catalyst, thereby allowing an improvement in reduction in deterioration of exhaust emission.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
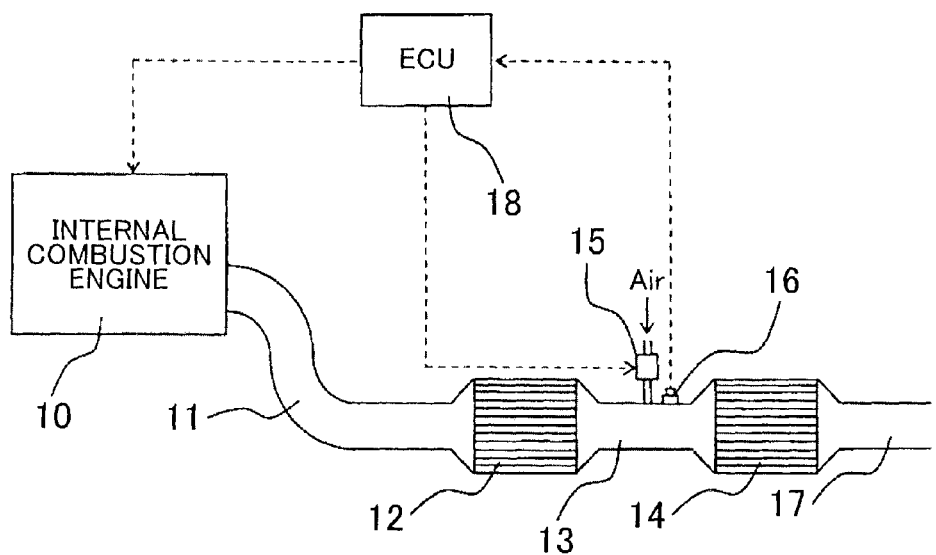
FIG. 1 schematically illustrates an embodiment of an exhaust gas control apparatus in accordance with the present invention.

In a three-way catalyst generally used as an exhaust gas purifying catalyst, in order to simultaneously and efficiently purify three components that are CO, HC, and NOx by a function of the three-way catalyst, a ratio of air to fuel (air-fuel ratio A/F) that are supplied to an automobile engine is controlled to fall around the stoichiometric air-fuel ratio. However, an actual air-fuel ratio fluctuates to a fuel rich (fuel rich atmosphere) side or a fuel lean (fuel lean atmosphere) side around the stoichiometric air-fuel ratio as the center in response to the travel condition of an automobile. Accordingly, the atmosphere of the exhaust gas similarly fluctuates to the fuel rich side or the fuel lean side. When the air-fuel ration of the exhaust gas is on the fuel rich side, as described above, there is a problem such that nitrogen ($N_2$) contained in the exhaust gas is reduced by HC or the like and ammonia ($NH_3$) is produced. On the other hand, for example, when a metal other than the platinum group metals as a catalyst component of a NOx purification catalyst, particularly a base metal, is used, in order to sufficiently reduce and purify the NOx contained in the exhaust gas by the base metal, it is in general required that the air-fuel ratio of the exhaust gas flowing into the NOx purification catalyst be controlled not to the stoichiometric air-fuel ratio but to a fuel rich air-fuel ratio. However, such a case results in a very considerable production of ammonia in the exhaust gas.

Further, for example, in a urea selective catalytic reduction type NOx catalyst (so-called SCR catalyst) which is used in a diesel engine, ammonia obtained by hydrolysis of urea is used to reduce and purify NOx in the exhaust gas to nitrogen. However, a part of ammonia produced by hydrolysis of urea does not necessarily contribute to such reduction but may be discharged outside of the exhaust gas control apparatus while remaining unreacted. On the other hand, in an ammonia oxidation catalyst suggested in a related art, for example, its high oxidation activity causes the ammonia contained in the exhaust gas to be oxidized to nitrogen oxides such as NO and nitrogen dioxide ($NO_2$) instead of nitrogen. As a result, a sufficient improvement in exhaust emission may not be achieved.

An exhaust gas control apparatus for an internal combustion engine in accordance with the present invention includes a NOx purification catalyst and an oxidation catalyst, particularly the NOx purification catalyst and the oxidation catalyst mainly containing base metals as catalyst components. In the exhaust gas control apparatus, the air-fuel ratio of the exhaust gas flowing into the oxidation catalyst is appropriately controlled in response to the temperature of the oxidation catalyst. This allows selective oxidation of ammonia to nitrogen contained in the exhaust gas or produced in the exhaust gas according to operational conditions of the NOx purification catalyst, instead of oxidation to nitrogen oxides such as NO and $NO_2$. This allows improvement in reduction in deterioration of exhaust emission.

More specifically explaining, in the oxidation reaction of ammonia, the reaction rate of the oxidation reaction becomes faster under a high temperature condition where energy required for the reaction is largely supplied. As a result, the oxidation of ammonia by the oxidation catalyst is facilitated, and a large part of ammonia contained in the exhaust gas is in turn oxidized to nitrogen oxides such as NO and $NO_2$ instead of nitrogen. Accordingly, in the present invention, when the temperature of the oxidation catalyst exceeds a predetermined temperature, the air-fuel ratio of the exhaust gas flowing into the oxidation catalyst is controlled to fall around the stoichiometric air-fuel ratio. In other words, the air-fuel ratio is controlled to obtain an atmosphere where oxidation of ammonia is relatively hindered. This hinders the oxidation of ammonia to nitrogen oxides and thereby allows selective production of nitrogen. Meanwhile, in the present invention, when the temperature of the oxidation catalyst is a predetermined temperature or lower, the air-fuel ratio of the exhaust gas flowing into the oxidation catalyst is controlled to a more fuel lean air-fuel ratio than the stoichiometric air-fuel ratio. In other words, the air-fuel ratio is controlled to obtain an atmosphere where oxidation of ammonia is relatively facilitated. This facilitates the oxidation of ammonia to nitrogen.

In the present invention, "stoichiometric air-fuel ratio" includes the air-fuel ratios in the range of A/F (air-fuel ratio) =14.6±0.1.

Embodiments of the exhaust gas control apparatus for an internal combustion engine in accordance with the present invention will be described hereinafter in detail with reference to drawings. It should be understood that the descriptions made hereinafter are mere examples of the embodiments of the present invention and the present invention is not limited to such particular embodiments.

FIG. 1 schematically illustrates an embodiment of an exhaust gas control apparatus in accordance with the present invention.

Referring to FIG. 1, an exhaust side of an internal combustion engine 10 is coupled to a NOx purification catalyst 12 via an exhaust passage 11. Further, an outlet of the NOx purification catalyst 12 is coupled to an exhaust passage 13. An oxidation catalyst 14 is further coupled to the exhaust passage 13. A pump 15 (air introduction apparatus) for introducing air into the exhaust passage 13 is connected to the exhaust passage 13 on the upstream side of the oxidation catalyst 14. Here, the NOx purification catalyst 12 has a first catalyst metal carried on a catalyst carrier. The oxidation catalyst 14 has second catalyst metals carried on a catalyst carrier. A temperature sensor 16 (catalyst temperature detector) for detecting the temperature of the oxidation catalyst 14 is mounted in the exhaust passage 13 on the upstream side of the oxidation catalyst 14. An temperature sensor 16 is electrically connected to an electronic control unit (ECU) 18. The output of the pump 15 is adjusted by the ECU 18 on the basis of the temperature of the oxidation catalyst 14 which is detected by the temperature sensor 16, thereby enabling control of the air-fuel ratio of the exhaust gas flowing into the oxidation catalyst 14. It is sufficient that the temperature sensor 16 is capable of simply detecting the temperature of the oxidation catalyst 14. For example, the temperature sensor 16 may be mounted on a casing of the oxidation catalyst 14 or may be mounted in an exhaust passage 17 on the downstream side of the oxidation catalyst 14.

According to the present invention, any metal may be a first catalyst metal contained in the NOx purification catalyst 12 as a catalyst component and is not particularly limited as long as the metal can reduce and purify NOx in the exhaust gas. Examples may include copper (Cu), iron (Fe), nickel (Ni), manganese (Mn), platinum (Pt), palladium (Pd), rhodium (Rh), gold (Au), and combinations thereof. The catalyst may use Cu. Further, when Cu or another base metal is used as the first catalyst metal in the present invention, in order to sufficiently reduce and purify NOx contained in the exhaust gas, the air-fuel ratio of the exhaust gas flowing into the NOx purification catalyst 12 is controlled to be a more fuel rich air-fuel ratio than the stoichiometric air-fuel ratio.

Further, as the catalyst carrier which carries the first catalyst metal, although not particularly limited, any metal oxide which is in general used as a catalyst carrier may be used. Examples of such a catalyst carrier may include metal oxides selected from the group of alumina ($Al_2O_3$), silica ($SiO_2$), silica-alumina ($SiO_2$—$Al_2O_3$), zeolite (such as ZSM-5), zirconia ($ZrO_2$), ceria ($CeO_2$), ceria-zirconia ($CeO_2$—$ZrO_2$), titania ($TiO_2$), and combinations thereof.

In the exhaust gas control apparatus in accordance with the present invention, a known so-called three-way catalyst which uses the platinum group elements such as Pt and Rh may be used as the NOx purification catalyst 12. Alternatively, a urea selective catalytic reduction type NOx catalyst (SCR catalyst) which is used in a diesel engine may be used. However, in this specification, to facilitate understanding, a case will be described where a material having base metals such as Cu and Fe carried on the catalyst carrier is used as the NOx purification catalyst 12.

Specifically describing an embodiment of the exhaust gas control apparatus in accordance with the present invention, which is shown in FIG. 1, in a case that the NOx purification catalyst 12 mainly contains a base metal as a catalyst component, the air-fuel ratio of the exhaust gas flowing into the NOx purification catalyst 12 is usually controlled to a more fuel rich air-fuel ratio than the stoichiometric air-duel ratio by the ECU 18. The NOx in the exhaust gas is reduced and purified by the NOx purification catalyst 12. However, at such a fuel rich air-fuel ratio, $N_2$ contained in the exhaust gas is reduced by HC or the like, and this may result in production of $NH_3$. Accordingly, in this embodiment, $NH_3$ produced in such a process is oxidized and decomposed to $N_2$ and $H_2O$ by the oxidation catalyst 14 disposed in the exhaust passage 13 on the downstream side of the NOx purification catalyst 12 and $O_2$ in the air introduced from the pump 15.

At this point, when the temperature of the oxidation catalyst 14 is a predetermined temperature or lower, the oxidation reaction rate of ammonia by the oxidation catalyst 14 is slow. Therefore, the air amount introduced from the pump 15 is increased, and the air-fuel ratio of the exhaust gas flowing into the oxidation catalyst 14 is thereby controlled to a more fuel lean air-fuel ratio than the stoichiometric air-fuel ratio. In other words, the air-fuel ratio is controlled so that the oxidation reaction rate of ammonia becomes faster. This facilitates oxidation of ammonia to, nitrogen. On the other hand, when the temperature of the oxidation catalyst 14 exceeds the predetermined temperature, the oxidation reaction rate of ammonia by the oxidation catalyst 14 is fast. Therefore, the air amount introduced from the pump 15 is reduced, and the air-fuel ratio of the exhaust gas flowing into the oxidation catalyst 14 is thereby controlled to fall around the stoichiometric air-fuel ratio. In other words, the air-fuel ratio is controlled so that the oxidation reaction rate of ammonia becomes slower. Accordingly, oxidation of ammonia to nitrogen oxides such as NO and $NO_2$ is hindered so that nitrogen is selectively produced. This allows selective oxidation of $NH_3$ contained in the exhaust gas to nitrogen instead of nitrogen oxides in the entire temperature range where the oxidation catalyst 14 is exposed. This allows improvement in reduction in deterioration of exhaust emission.

Further, the exhaust gas in general contains harmful components such as HC and CO other than NOx and $NH_3$. However, according to this embodiment, as described above, the air-fuel ratio of the exhaust gas flowing into the oxidation catalyst 14 is constantly controlled to fall around the stoichiometric air-fuel ratio or a more fuel lean air-fuel ratio than that by the air introduced from the pump 15. Accordingly, those harmful components such as HC and CO can be also oxidized and purified by the oxidation catalyst 14 and $O_2$ in the air introduced from the pump 15.

The air-fuel ratio of the exhaust gas flowing into the oxidation catalyst 14 is preliminary provided from an engine speed or a torque of the internal combustion engine 10, a fuel injection amount, an intake air amount, and further an air introduction amount of the pump 15, for example. The air-fuel ratio can be then calculated by use of a map stored in the ECU 18. Alternatively, the air-fuel ratio can be controlled by adjusting the output of the pump 15 on the basis of the map. Still alternatively, in this embodiment, an oxygen sensor, an air-fuel ratio sensor, or the like can be used to calculate and/or control the air-fuel ratio of the exhaust gas flowing into the oxidation catalyst 14. In such a case, an oxygen sensor may be used in consideration of cost and the like.

Here, the output value of the oxygen sensor varies in response to how fuel rich or fuel lean the air-fuel ratio is. For example, as the oxygen sensor, a zirconia oxygen sensor can be used that has zirconia which is an electrolyte interposed between a reference electrode in contact with the atmosphere and a measuring electrode in contact with the exhaust gas, and that produces electromotive force corresponding to the oxygen concentration difference between both the electrodes. The zirconia oxygen sensor, across the stoichiometric air-fuel ratio (around approximately 0.5 V) being the border, outputs a voltage higher than approximately 0.6 V when an actual air-fuel ratio is more fuel rich than the stoichiometric air-fuel ratio and outputs a voltage lower than approximately 0.4 V when the actual air-fuel ratio is more fuel lean than the stoichiometric air-fuel ratio. In the embodiment of the present invention, the oxygen sensor is mounted in the exhaust passage 17 on the downstream side of the oxidation catalyst 14 and is electrically connected to the ECU 18. The ECU 18 adjusts the air amount introduced from the pump 15 on the basis of the output value from the oxygen sensor, thereby allowing control of the air-fuel ratio of the exhaust gas flowing into the oxidation catalyst 14. In a case that the air-fuel ratio sensor is used, the process for controlling the air-fuel ratio is similar to the case that the oxygen sensor is used. In other words, the air-fuel ratio sensor is mounted in the exhaust passage 17 on the downstream side of the oxidation catalyst 14 and is electrically connected to the ECU 18. The ECU 18 adjusts the air amount introduced from the pump 15 on the basis of the output value from the oxygen sensor, and the air-fuel ratio of the exhaust gas flowing into the oxidation catalyst 14 may thereby be controlled.

Figure 2:
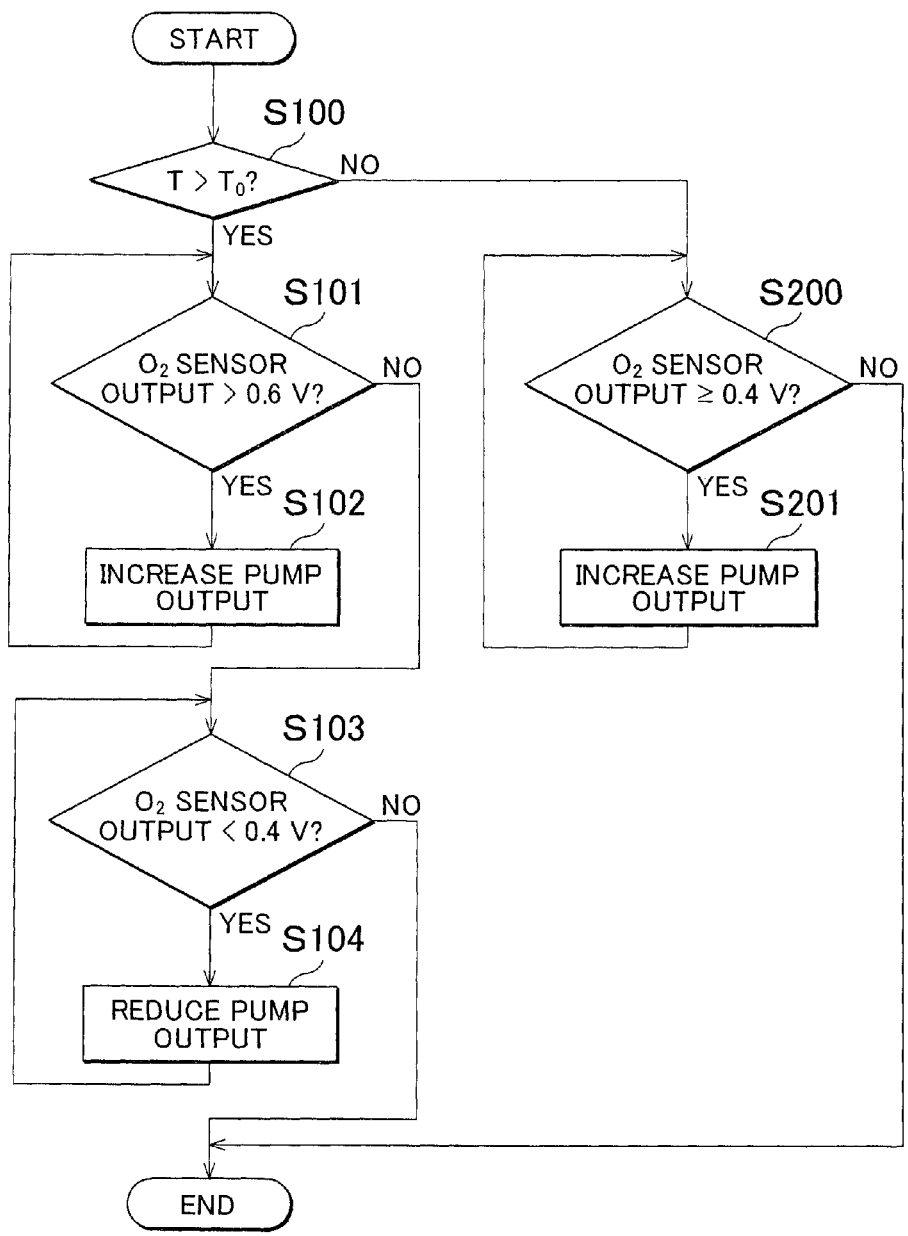
FIG. 2 is a flowchart illustrating control of the exhaust gas control apparatus in accordance with the present invention illustrated in FIG. 1 in a case that an oxygen sensor is used.

FIG. 2 is a flowchart illustrating control of the exhaust gas control apparatus in accordance with the present invention illustrated in FIG. 1 in a case that the oxygen sensor is used. The control is performed as a routine executed by the ECU 18 as an interrupt made at each preset period.

Referring to FIG. 2, first in step 100, a determination is made whether or not a temperature T of the oxidation catalyst 14 which is detected by the temperature sensor 16 exceeds a predetermined temperature $T_0$ at which the oxidation catalyst 14 exhibits a relatively higher oxidation activity. If it is determined that $T>T_0$, the process progresses to step 101. Here, the temperature $T_0$ is not necessarily limited to a particular value since the temperature $T_0$ may vary in response to kinds or the like of catalyst metals used as the catalyst component in the oxidation catalyst 14, for example. However, in general, the temperature $T_0$ may be set to any temperature between approximately 300° C. and 400° C. Particularly in a case that a base metal such as Cu or Fe which is a catalyst metal used for the catalyst component of the oxidation catalyst 14, the temperature $T_0$ can be set to approximately 350° C.

If $T>T_0$ in step 100, to hinder oxidation of ammonia contained in the exhaust gas to nitrogen oxides by the oxidation catalyst 14, the air-fuel ratio of the exhaust gas flowing into the oxidation catalyst 14 is controlled to fall around the stoichiometric air-fuel ratio in subsequent steps. Specifically, in step 101, a determination is made whether or not the output value of the oxygen sensor exceeds 0.6 V. In other words, a determination is made whether or not the air-fuel ratio of the exhaust gas flowing into the oxidation catalyst 14 is a fuel rich air-fuel ratio. If the output of the oxygen ($O_2$) sensor >0.6 V, in other words, if the air-fuel ratio of the exhaust gas flowing into the oxidation catalyst 14 is a fuel rich air-fuel ratio, the process progresses to step 102. In step 102, the output of the pump 15 is increased so that the air-fuel ratio of the exhaust gas flowing into the oxidation catalyst 14 becomes the stoichiometric air-fuel ratio. This increases the air amount introduced into the exhaust passage 13 on the upstream side of the oxidation catalyst 14.

On the other hand, if the output of the oxygen ($O_2$) sensor≤0.6 V in step 101, in other words, if the air-fuel ratio of the exhaust gas flowing into the oxidation catalyst 14 is the stoichiometric air-fuel ratio or a fuel lean air-fuel ratio, the process progresses to step 103. In step 103, a determination is made whether or not the output value of the oxygen sensor is lower than 0.4 V. In other words, a determination is made whether the air-fuel ratio of the exhaust gas flowing into the oxidation catalyst 14 is the stoichiometric air-fuel ratio or a fuel lean air-fuel ratio. If the output of the oxygen sensor <0.4 V, in other words, if the air-fuel ratio of the exhaust gas flowing into the oxidation catalyst 14 is a fuel lean air-fuel ratio, the process progresses to step 104. In step 104, the output of the pump 15 is reduced so that the air-fuel ratio of the exhaust gas flowing into the oxidation catalyst 14 becomes the stoichiometric air-fuel ratio. This reduces the air amount introduced into the exhaust passage 13 on the upstream side of the oxidation catalyst 14. On the other hand, in step 103, if the output of the oxygen sensor ≥0.4 V, it is determined that the air-fuel ratio of the exhaust gas flowing into the oxidation catalyst 14 is the stoichiometric air-fuel ratio, and the routine is terminated.

If $T≤T_0$ in step 100, oxidation of ammonia in the exhaust gas to the nitrogen by the oxidation catalyst 14 is facilitated. Therefore, in subsequent steps, the air-fuel ratio of the exhaust gas flowing into the oxidation catalyst 14 is controlled to a more fuel lean air-fuel ratio than the stoichiometric air-fuel ratio. Specifically, in step 200, a determination is made whether or not the output value of the oxygen sensor is 0.4 V or higher. In other words, a determination is made whether or not the air-fuel ratio of the exhaust gas flowing into the oxidation catalyst 14 is a fuel lean air-fuel ratio. If the output of the oxygen sensor ≥0.4 V, in other words, if the air-fuel ratio of the exhaust gas flowing into the oxidation catalyst 14 is not a fuel lean air-fuel ratio, the process progresses to step 201. Next, in step 201, the output of the pump 15 is increased, thereby increasing the air amount introduced into the exhaust passage 13 on the upstream side of the oxidation catalyst 14. Control is made so that the air-fuel ratio of the exhaust gas flowing into the oxidation catalyst 14 becomes a fuel lean air-fuel ratio. On the other hand, in step 200, if the output of the oxygen sensor <0.4 V, it is determined that the air-fuel ratio of the exhaust gas flowing into the oxidation catalyst 14 is a fuel lean air-fuel ratio, and the routine is terminated.

The oxidation catalyst 14 will next be described in detail. According to the present invention, examples of second catalyst metals contained in the oxidation catalyst 14 as catalyst components may include copper (Cu), iron (Fe), nickel (Ni), chromium (Cr), cerium (Ce), cobalt (Co), magnesium (Mg), zinc (Zn), and combinations thereof. Alternatively, Cu, Fe, or a combination thereof may be used. Still alternatively, as the second catalyst metals contained in the oxidation catalyst 14 as a catalyst component, platinum (Pt), palladium (Pd), silver (Ag), or combinations thereof may be used.

Moreover, as the catalyst carrier which carries the second catalyst metals, although not particularly limited, any metal oxide which is in general used as a catalyst carrier may be used. Examples of such a catalyst carrier may include metal oxides selected from the group of alumina ($Al_2O_3$), silica ($SiO_2$), silica-alumina ($SiO_2$—$Al_2O_3$), zeolite (such as ZSM-5), zirconia ($ZrO_2$), ceria ($CeO_2$), ceria-zirconia ($CeO_2$—$ZrO_2$), titania ($TiO_2$), and combinations thereof. Alternatively, a metal oxide selected from the group of alumina, zeolite, titania, and combinations thereof may be used. It is considered that ammonia is primarily adsorbed by acid sites on the catalyst in a lower temperature range, for example, a temperature range lower than 350° C. Accordingly, as the catalyst carrier which carries the second catalyst metals, the metal oxide such as alumina, zeolite, or titania which has relatively many acid sites is used, and adsorption of ammonia on the oxidation catalyst 14 is thereby facilitated at a low temperature. This allows an improvement in oxidation of ammonia to nitrogen by the second catalyst metals.

According to the embodiment of the exhaust gas control apparatus in accordance with the present invention, the oxidation catalyst 14 is formed with a pre-stage section in an upstream side of the exhaust gas flow and a post-stage section in a downstream side of the exhaust gas flow. In other words, the oxidation catalyst 14 is formed with the pre-stage section and the post-stage section. The pre-stage section is arranged on the upstream side of the oxidation catalyst 14 in the direction of the exhaust gas flow. The post-stage section is arranged on the downstream side of the oxidation catalyst 14 in the direction of the exhaust gas flow. As the second catalyst metals of the oxidation catalyst 14, at least one of Cu and Fe and at least one of Pt, Pd, and Ag are used. Further, at least one of Cu and Fe may be carried on the pre-stage section of the oxidation catalyst 14, and at least one of Pt, Pd, and Ag may be carried only on the post-stage section of the oxidation catalyst 14. Alternatively, at least one of Cu and Fe may be carried on both of the pre-stage and post-stage sections of the oxidation catalyst 14.

Since metals such as Pt, Pd, and Ag have very high oxidation activities, when these metals are used as the second catalyst metals of the oxidation catalyst 14, and particularly when these metals are carried on the upstream side of the oxidation catalyst 14 in the direction of the exhaust gas flow or in the entire range of the upstream and downstream sides in the direction of the exhaust gas flow, $NH_3$ may be oxidized to nitrogen oxides (NOx) such as NO and $NO_2$ instead of $N_2$. In such a case, the discharge amount of NOx to the outside increases, and this may result in deterioration of exhaust emission. On the other hand, when metals such as Cu and Fe that have relatively low oxidation activities are used as the second catalyst metals of the oxidation catalyst 14, oxidation of $NH_3$ to NOx is hindered; however, oxidation of $NH_3$ to $N_2$ may not sufficiently take place. In such a case, a part of $NH_3$ contained in the exhaust gas may be discharged to the outside while it remains unreacted.

Therefore, in the embodiment of the exhaust gas control apparatus in accordance with the present invention, at least one of Cu and Fe is carried on the pre-stage section of the oxidation catalyst 14 or carried on both of the pre-stage and post-stage sections of the oxidation catalyst 14, and at least one of Pt, Pd, and Ag is carried only on the post-stage section of the oxidation catalyst 14. Accordingly, $NH_3$ in the exhaust gas is selectively oxidized to $N_2$ instead of NOx by Cu and/or Fe, and unreacted $NH_3$ can be certainly purified by Pt, Pd, and/or Ag carried on the post-stage section of the oxidation catalyst 14. Further, although it should be understood that the present invention is not limited to any particular theory, for example, the air-fuel ratio of the exhaust gas flowing into the oxidation catalyst 14 is controlled to fall around the stoichiometric air-fuel ratio in a high temperature condition where the temperature of the oxidation catalyst 14 exceeds 350° C. Moreover, oxygen in the exhaust gas is consumed to a certain extent in an oxidation reaction by Cu and/or Fe carried on the pre-stage section of the oxidation catalyst 14. Therefore, the oxidation activity itself of Pt, Pd, and/or Ag carried on the post-stage section of the oxidation catalyst 14 is high. However, there is no excess oxygen which can contribute to oxidation reactions in the exhaust gas around those catalyst metals. As a result, unreacted $NH_3$ is hindered from being oxidized to NOx by those catalyst metals. Accordingly, the exhaust gas control apparatus having such a configuration allows an improvement in exhaust emission compared to, for example, cases that only Cu and/or Fe are carried on the oxidation catalyst 14 as the second catalyst metals and that besides those metals, Pt, Pd, and/or Ag are carried on the pre-stage section of the oxidation catalyst 14.

Further, the exhaust gas in general contains harmful components such as HC and CO other than NOx and $NH_3$. It is known that metals such as Pt, Pd, and Ag have very high oxidation activities against the harmful components such as HC and CO. Therefore, those metals are used as the second catalyst metals of the oxidation catalyst 14 in the post-stage section of the oxidation catalyst 14, and HC and CO in the exhaust gas can be thereby certainly oxidized and purified compared to cases that only base metals such as Cu and Fe are used as the second catalyst metals. The area of the oxidation catalyst 14 in which Pt, Pd, and/or Ag are carried may be appropriately determined according to desired oxidation performance of the oxidation catalyst 14 and particularly oxidation performance against $NH_3$, HC, and CO. Although the present invention is not particularly limited, for example, Pt, Pd, and/or Ag may be carried on the post-stage section of the oxidation catalyst 14 in a range of 5% to 50% of the entire length of the oxidation catalyst 14 in order to hinder oxidation of $NH_3$ to NOx, certainly purify unreacted $NH_3$, and further sufficiently oxidize and purify the harmful components such as HC and CO in the exhaust gas. Further, in view of replacement of the platinum group elements with other metals, Ag may be carried on the post-stage section of the oxidation catalyst 14 instead of Pt and Pd.

The oxidation catalyst 14 and the NOx purification catalyst 12 used in the exhaust gas control apparatus in accordance with the present invention can be prepared by any method known to persons having ordinary skill in the art. For example, a solution containing salts of the first and second catalyst metals used as the catalyst components in the catalysts is added to a predetermined amount of a solution having powder of the catalyst carrier dispersed therein, in the amount such that the carried amount of the catalyst metals generally falls within the range of 0.01 wt % to 10 wt %. Then, the mixture is dried and baked at a predetermined temperature and for a predetermined time period, in other words, at a temperature and in a time period sufficient for decomposing and removing the salt portions of the catalyst metals and allowing the catalyst metals to be carried on the catalyst carriers. Accordingly, the NOx purification catalyst 12 and the oxidation catalyst 14 where the first and second catalyst metals are carried on the respective catalyst carriers can be obtained. Further, for example, those catalysts may be pressed under high pressure to mold them into pellets or slurried with a predetermined binder added thereto and then coated onto a catalyst substrate such as a cordierite honeycomb substrate, and can thereby be used.

In the embodiment of the exhaust gas control apparatus in accordance with the present invention, as described above, in the case that the NOx purification catalyst 12 includes particularly a base metal such as Cu as the first catalyst metal, the air-fuel ratio of the exhaust gas flowing into the NOx purification catalyst 12 is usually controlled to a more fuel rich air-fuel ratio than the stoichiometric air-fuel ratio, and the NOx purification catalyst 12 reduces and purifies NOx in the exhaust gas. However, operation at an extremely more fuel rich air-fuel ratio than the stoichiometric air-fuel ratio is not preferable in general since such operation results in largely impaired fuel efficiency. Therefore, according to the embodiment of the exhaust gas control apparatus in accordance with the present invention, the air-fuel ratio of the exhaust gas flowing into the NOx purification catalyst 12 may be controlled to an air-fuel ratio such as A/F=approximately 14.4.

On the other hand, when the first catalyst metal contained as the catalyst component in the NOx purification catalyst 12 is exposed to an atmosphere having a particularly high oxygen concentration such as in fuel-cut control performed when the accelerator pedal is released, a surface of the first catalyst metal is covered by oxygen. In other words, the surface of the first catalyst metal is subject to oxygen poisoning. This may result in impairment in NOx purification performance of the NOx purification catalyst 12. Particularly in a case that a base metal is used as the first catalyst metal of the NOx purification catalyst 12 instead of an element of the platinum group, since the base metal is in general easily oxidized compared to the platinum group elements or the like, the NOx purification performance may be impaired due to such oxygen poisoning. Accordingly, in the embodiment of the exhaust gas control apparatus in accordance with the present invention, in a phase in which the fuel-cut control is stopped, specifically, in a phase in which the engine speed lowers to a predetermined speed or less, or in a phase in which the accelerator pedal is operated, the air-fuel ratio of the exhaust gas flowing into the NOx purification catalyst 12 is controlled to a still more fuel rich air-fuel ratio than a fuel rich air-fuel ratio (for example, A/F=approximately 14.4) during normal travel. For example, the air-fuel ratio can be switched to a fuel rich air-fuel ratio such as A/F=approximately 14.0 momentarily or for a predetermined time period. This relieves the oxygen poisoning of the first catalyst metal, particularly the base metal which has been subject to the oxygen poisoning. Accordingly, the NOx purification catalyst 12 can be recovered from a degraded state to a highly active state.

According to the embodiment of the exhaust gas control apparatus in accordance with the present invention, the air-fuel ratio of the exhaust gas flowing into the NOx purification catalyst 12 is switched between a first air-fuel ratio which is more fuel rich than the stoichiometric air-fuel ratio such as A/F=approximately 14.0 and a second air-fuel ratio which is more fuel lean than the stoichiometric air-fuel ratio such as A/F=approximately 14.8. As described above, when the NOx purification catalyst 12 contains particularly a base metal such as Cu as the first catalyst metal, the air-fuel ratio of the exhaust gas flowing into the NOx purification catalyst 12 is controlled to a fuel rich air-fuel ratio such as A/F=approximately 14.4. However, at such a fuel rich air-fuel ratio, the surface of the first catalyst metal which is a base metal such as Cu is subject to HC poisoning by HC or the like contained in the exhaust gas. This may result in impaired NOx purification performance of the NOx purification catalyst 12. However, according to the above embodiment of the exhaust gas control apparatus in accordance with the present invention, even when the first catalyst metal on the NOx purification catalyst 12 has been subject to HC poisoning at the first air-fuel ratio which is more fuel rich than the stoichiometric air-fuel ratio, the air-fuel ratio is switched to the second air-fuel ratio which is more fuel lean than the stoichiometric air-fuel ratio, and such HC poisoning can be easily relieved. On the other hand, even if the first catalyst metal on the NOx purification catalyst 12 has been subject to the oxygen poisoning described above at the second air-fuel ratio which is more fuel lean than the stoichiometric air-fuel ratio, the air-fuel ratio is switched to the first air-fuel ratio which is more fuel rich than the stoichiometric air-fuel ratio, and such oxygen poisoning is thereby relieved to allow the NOx purification catalyst 12 to recover from a degraded state.

In the embodiment described above, the first air-fuel ratio is approximately 14.0, and the second air-fuel ratio is approximately 14.8. However, the first and second air-fuel ratios are not necessarily limited to the values described above. Any appropriate values can be selected according to desired NOx purification performance or the like of the NOx purification catalyst 12. Further, the timing of switching between the first and second air-fuel ratios may be appropriately determined in consideration of a specific value of each of the air-fuel ratios, the extent of degradation of the NOx purification catalyst 12, and various parameters. For example, the engine may be usually operated at the first air-fuel ratio which is more fuel rich than the stoichiometric air-fuel ratio, and the air-fuel ratio may be continually switched to the second air-fuel ratio which is more fuel lean than the stoichiometric air-fuel ratio. In other words, the engine may be operated such that a so-called lean spike is caused. Alternatively, the engine may be operated such that the air-fuel ratio is switched between the first and second air-fuel ratios, for example, in each one second or in a time interval shorter than that. The latter method allows the total operation time at a fuel rich air-fuel ratio to be short compared to the former method, and reduction in impairment in fuel efficiency can thus be improved.

The present invention will be described hereinafter more in detail with examples. However, the present invention is not limited to the examples.

[Examination of Oxidation Catalyst]

In this experiment, the catalyst components of the oxidation catalyst used in the exhaust gas control apparatus in accordance with the present invention was examined as described below.

[Preparation Of Oxidation Catalyst a Containing Cu (Cu Carried Amount 2 wt %)]

First, a predetermined amount of zeolite powder (SAPO: Mitsubishi Plastics, Inc.) as the catalyst carrier was added to 500 mL of distilled water, and the mixture was stirred. Then, a solution having copper nitrate dissolved therein was added to the mixture, in the amount such that the Cu carried amount of the oxidation catalyst finally obtained becomes 2 wt %.

Thereafter, the mixture was stirred at 50° C. for eight hours for ion exchanging. Next, the obtained solution was filtered, and the filtered precipitate was washed and dried in a dryer at 120° C. for 12 hours. The obtained power was baked in air at 500° C. for two hours. Cu carrying zeolite power was thereby obtained.

Next, 167 parts of the obtained Cu carrying zeolite powder were mixed with 20 parts of alumina powder (Sasol Ltd.) and 13 parts of alumina binder (Nissan Chemical Industries, Ltd: AS200), water was added thereto, and a coating slurry was prepared. Then, the obtained slurry was coated onto a ceramic substrate in the amount of 200 g/substrate liter (per one liter of the substrate) by the wash-coating method. Thereafter, the ceramic substrate coated with the slurry was baked in an electric furnace at 250° C. for two hours. The oxidation catalyst A (Cu carried amount 2 wt %) containing Cu as the catalyst component was thereby obtained.

[Preparation Of Oxidation Catalyst B Containing Fe (Fe Carried Amount 2 wt %)]

The oxidation catalyst B (Fe carried amount 2 wt %) containing Fe as the catalyst component was obtained in a preparation method similar to the oxidation catalyst A except that iron sulfate was used instead of copper nitrate and beta zeolite (BEA) from TOSOH CORPORATION instead of SAPO from Mitsubishi Plastics, Inc. was used as the zeolite powder.

[Preparation of Oxidation Catalyst C Containing Ag and Fe (Ag Carried Amount 1 Wt % and Fe Carried Amount 2 Wt %)]

The oxidation catalyst C (Ag carried amount 1 wt % and Fe carried amount 2 wt %) containing Ag and Fe as the catalyst components was obtained in a preparation method similar to that of the oxidation catalyst B except that Ag carrying alumina powder which is alumina powder carrying Ag was used instead of the alumina powder.

[Preparation of Oxidation Catalyst D Containing Pt and Fe (Pt Carried Amount 1 Wt % and Fe Carried Amount 2 Wt %)]

The oxidation catalyst D (Pt carried amount 1 wt % and Fe carried amount 2 wt %) containing Pt and Fe as the catalyst components was obtained in a preparation method similar to that of the oxidation catalyst B except that Pt carrying alumina powder which is alumina powder carrying Pt was used instead of the alumina powder.

[Activity Evaluation of Oxidation Catalysts A to D]

Next, $NH_3$ purification abilities of oxidation catalysts A to D were evaluated. Specifically, a fixed bed flow reactor (JAPAN CHEMICAL INDUSTRIES Co., Ltd) was used, and a model gas for evaluation shown in Table 1 attached below was introduced to each of the oxidation catalysts A to D in the flow amount of 15 L/min (space velocity SV=25714/h). The $O_2$ concentration in the model gas for evaluation was varied to zero %, 0.06%, 0.5%, 1.0%, and 5.0%, and the conversion rate (%) of $NH_3$ to $N_2$ was measured at temperatures of 465° C. and 310° C. The conversion rate (%) of $NH_3$ to $N_2$ was calculated by the following equation. FIG. 3 shows the results. Conversion rate (%)=(flowing in $NH_3$ amount−unreacted $NH_3$ amount−NO production amount−$NO_2$ production amount−2×$N_2O$ production amount)×100÷(flowing in $NH_3$ amount). The unreacted $NH_3$ amount, NO production amount, $NO_2$ production amount, and $N_2O$ production amount on the catalyst outlet side were measured by use an FT-IR analyzer (HORIBA, Ltd.: 6000FT). Meanwhile, the $O_2$ concentration in the model gas for evaluation was measured by another analyzer (HORIBA, Ltd.: 7100H).

TABLE 1

Composition of Model Gas for Evaluation

| | Gas Composition | | | |
|---|---|---|---|---|
| | $NH_3$ (ppm) | $O_2$ (%) | $H_2O$ (%) | $N_2$ |
| Model Gas for Evaluation | 800 | 0 to 5.0 | 3 | Residue |

Figure 3A:
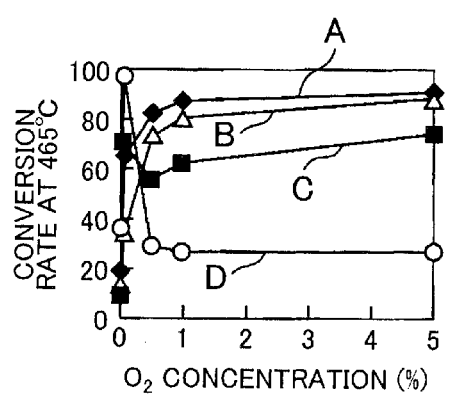
FIG. 3A is a graph representing conversion rates (%) of $NH_3$ to $N_2$ of oxidation catalysts A to D at 465° C.
Figure 3B:
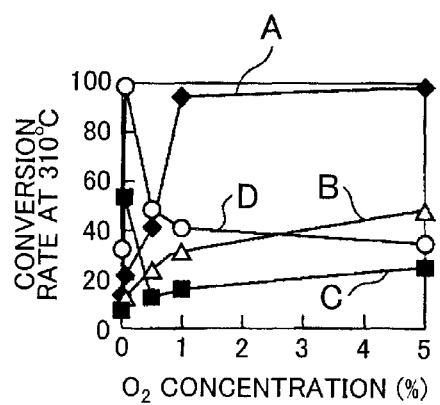
FIG. 3B is a graph representing conversion rates (%) of $NH_3$ to $N_2$ of the oxidation catalysts A to D at 310° C.

FIG. 3A is a graph representing conversion rates (%) of $NH_3$ to $N_2$ of the oxidation catalysts A to D at 465° C. FIG. 3B is a graph representing conversion rates (%) of $NH_3$ to $N_2$ of the oxidation catalysts A to D at 310° C. In FIGS. 3A and 3B, the horizontal axes represent the $O_2$ concentrations (%) in the model gas for evaluation, and the vertical axes represent the conversion rates (%) of $NH_3$ to $N_2$. In the figures, the points at which the $O_2$ concentrations are zero % correspond to a fuel rich air-fuel ratio, the points at which the $O_2$ concentrations are 0.06% correspond to the stoichiometric air-fuel ratio (A/F=approximately 14.6), and the points at which the $O_2$ concentrations are 0.5%, 1.0%, and 5.0% correspond to fuel lean air-fuel ratios.

Referring to FIGS. 3A and 3B, it can be understood that the oxidation catalysts C and D that respectively have Ag and Pt with high oxidation activities as the catalyst components show very high conversion rates at both the temperatures of 465° C. and 310° C. under the stoichiometric air-fuel ratio condition where the $O_2$ concentration is 0.06% compared to the oxidation catalysts A and B that respectively have only Cu and Fe as the catalyst components. Particularly, the oxidation catalyst D having Pt as the catalyst component achieved a conversion rate of approximately 100% at both the temperatures of 465° C. and 310° C. under the stoichiometric air-fuel ratio condition. However, the oxidation catalysts C and D oxidized $NH_3$ in the model gas for evaluation to nitrogen oxides such as NO and $NO_2$ instead of $N_2$ at the fuel lean air-fuel ratios where the $O_2$ concentration was higher than 0.06%. As a result, the conversion rates of $NH_3$ to $N_2$ largely decreased. On the other hand, the oxidation catalysts A and B that respectively have only Cu and Fe with relatively low oxidation activities as the catalyst components exhibited low activities under the stoichiometric air-fuel ratio condition compared to the oxidation catalysts C and D. However, their oxidation activities largely increased at the fuel lean air-fuel ratios. Moreover, it can be understood that $NH_3$ was selectively oxidized to $N_2$ compared to the oxidation catalysts C and D.

In examples described below, the $NH_3$ purification abilities were examined in cases that the exhaust gas control apparatus in accordance with the present invention was controlled following the flowchart of FIG. 2.

[Preparation of NOx Purification Catalyst Containing Cu]

As the NOx oxidation catalyst, the same catalysts were used in all examples and comparative examples. First, 137 parts of alumina powder (Sasol Ltd.) and 13 parts of alumina binder (Nissan Chemical Industries, Ltd: AS200) were mixed, water was added thereto, and a coating slurry was prepared. Then, the obtained slurry is coated onto a ceramic substrate (NGK INSULATORS, LTD., cell shape: rectangular, wall thickness: four mils, cell number: 400 cells/square inch) in the amount of 150 g/substrate liter (per one liter of the substrate) by the wash-coating method. Thereafter, to a predetermined amount of water, copper (II) nitrate trihydrate is added in the amount such that the Cu carried amount becomes 0.118 mol/substrate liter (corresponding to 5 wt % carried amount as metal Cu). This solution was absorbed by the ceramic substrate, and the ceramic substrate was dried by a microwave dryer with ventilation at 120° C. for 20 minutes. Finally, the ceramic substrate was baked in an electric furnace at 250° C. for two hours to remove nitrate. The NOx purification catalyst (Cu carried amount 5 wt %) containing Cu as the catalyst component was thereby obtained.

Example 1

Preparation of Oxidation Catalyst Containing Cu

First, a predetermined amount of zeolite powder (SAPO: Mitsubishi Plastics, Inc.) as the catalyst carrier is added to 500 mL of distilled water, and the mixture was stirred. Then, a solution having copper nitrate dissolved therein was added to the mixture, in the amount such that the Cu carried amount of the oxidation catalyst finally obtained becomes 2 wt %. The mixture was then stirred at 50° C. for eight hours for ion exchanging. Next, the obtained solution was filtered, and the filtered precipitate was washed and dried in the dryer at 120° C. for 12 hours. The obtained power was baked in air at 500° C. for two hours. Cu carrying zeolite power was thereby obtained.

Next, 167 parts of the obtained Cu carrying zeolite powder were mixed with 20 parts of alumina powder (Sasol Ltd.) and 13 parts of alumina binder (Nissan Chemical Industries, Ltd: AS200), water was added thereto, and a coating slurry (slurry 1) was prepared. Then, the obtained slurry 1 is coated onto a ceramic substrate (NGK INSULATORS, LTD., cell shape: rectangular, wall thickness: four mils, cell number: 400 cells/square inch) in the amount of 200 g/substrate liter (per one liter of the substrate) by the wash-coating method. Thereafter, the ceramic substrate coated with the slurry was baked in the electric furnace at 500° C. for two hours. The oxidation catalyst (Cu carried amount 2 wt %) containing Cu as the catalyst component was thereby obtained.

Example 2

Preparation of Oxidation Catalyst Containing Cu in Pre-Stage and Post-Stage Sections and Pt in Post-Stage Section First, 167 parts of the obtained Cu carrying zeolite powder which was the same as the powder obtained in Example 1 were mixed with 20 parts of alumina powder (Sasol Ltd.) and 13 parts of alumina binder (Nissan Chemical Industries, Ltd: AS200), water was added thereto, and a coating slurry (slurry 2) was prepared. Then, the slurry 1 prepared in Example 1 was coated onto the pre-stage section on the upstream side of the exhaust gas flow of the ceramic substrate (NGK INSULATORS, LTD., cell shape: rectangular, wall thickness: four mils, cell number: 400 cells/square inch) in the width of 50% of the entire length of the ceramic substrate and in the amount of 200 g/substrate liter (per one liter of the substrate) by the wash-coating method. Then, the slurry 2 previously prepared was similarly coated onto the post-stage section on the downstream side of the exhaust gas flow of the ceramic substrate in the width of 50% of the entire length of the ceramic substrate and in the amount of 200 g/substrate liter. Finally, the obtained ceramic substrate was baked in the electric furnace at 500° C. for two hours. The oxidation catalyst (Cu carried amount 2 wt % and Pt carried amount 0.5 wt %) containing Cu in the pre-stage and post-stage sections and Pt in the post-stage section as the catalyst component was thereby obtained.

Example 3

Preparation of Oxidation Catalyst Containing Fe in Pre-Stage and Post-Stage Sections and Pt in Post-Stage Section The oxidation catalyst (Fe carried amount 2 wt % and Pt carried amount 0.5 wt %) containing Fe in the pre-stage and post-stage sections and Pt in the post-stage section as the catalyst components was obtained in a preparation method similar to Example 2 except that iron sulfate was used instead of copper nitrate and BEA from TOSOH CORPORATION instead of SAPO from Mitsubishi Plastics, Inc. was used as the zeolite powder.

Comparative Example 1

Preparation of Oxidation Catalyst Containing Cu in Pre-Stage and Post-Stage Sections and Pt in Pre-Stage Section The oxidation catalyst (Cu carried amount 2 wt % and Pt carried amount 0.5 wt %) containing Cu in the pre-stage and post-stage sections and Pt in the pre-stage section as the catalyst components was obtained in a preparation method similar to Example 2 except that the slurry 1 is coated onto the post-stage section of the ceramic substrate and the slurry 2 is coated onto the pre-stage section of the ceramic substrate.

Comparative Example 2

The same oxidation catalyst as Example 2 was used in Comparative Example 2.

[Purification of $NH_3$ by Use of Exhaust Gas Control Apparatus in Accordance with the Present Invention]

The NOx purification catalyst prepared as described above and each of the oxidation catalysts prepared in Examples 1 to 3 and Comparative Example 1 and 2 were mounted on an exhaust system of an actual engine (displacement: 2400 cc) as shown in FIG. 1. Purification of $NH_3$ contained in the exhaust gas was measured in a case that the engine speed was varied between 1200 rpm (corresponding to the exhaust gas at the temperature of 306° C. entering the oxidation catalysts) and 1600 rpm (corresponding to the exhaust gas at the temperature of 409° C. entering the oxidation catalysts). In this experiment, the air-fuel ratio of the exhaust gas flowing into the NOx purification catalyst positioned on the upstream side of the exhaust passage was alternated between A/F=14.0 and A/F=14.8 every 0.3 seconds. The air-fuel ratio of the exhaust gas flowing into the oxidation catalysts positioned on the downstream side of the NOx purification catalyst in the exhaust passage was controlled between approximately the stoichiometric air-fuel ratio and the fuel lean air-fuel ratio at $T_0$=350° C. following the flowchart of FIG. 2 in Examples 1 to 3 and Comparative Example 1. In comparative Example 2, switching among the air-fuel ratios according to the temperature was not conducted, and the air-fuel ratio was constantly controlled to the fuel lean air-fuel ratio. The conditions for the air-fuel ratio control and the catalyst configuration in each of the oxidation catalysts of Examples 1 to 3 and Comparative Examples 1 and 2 will be summarized in following Table 2.

TABLE 2

Condition for Air Fuel Ratio Control and Catalyst Configuration of Each of Oxidation Catalysts

| No. | Air-fuel ratio control | Catalyst Component of Pre-stage Section | Catalyst Component of Post-stage Section |
|---|---|---|---|
| Example 1 | Stoichiometric Air-fuel Ratio ↔ Fuel Lean Air-fuel Ratio | Cu | Cu |
| Example 2 | Stoichiometric Air-fuel Ratio ↔ Fuel Lean Air-fuel Ratio | Cu | Cu, Pt |
| Example 3 | Stoichiometric Air-fuel Ratio ↔ Fuel Lean Air-fuel Ratio | Fe | Fe, Pt |
| Comparative Example 1 | Stoichiometric Air-fuel Ratio ↔ Fuel Lean Air-fuel Ratio | Cu, Pt | Cu |
| Comparative Example 2 | Fuel Lean Air-fuel Ratio | Cu | Cu, Pt |

The conversion rate (%) of $NH_3$ to $N_2$ of the oxidation catalyst of each of Examples and Comparative Examples was measured at flow-in gas temperature of 306° C. and 409° C. Specifically, the $NH_3$ amount in the exhaust gas flowing into the oxidation catalyst and the unreacted $NH_3$ amount on the outlet side of the oxidation catalyst were measured by use of an FT-IR type $NH_3$ analyzer. Meanwhile, the NO, $NO_2$, and $N_2O$ production amounts on the outlet side of the oxidation catalyst were measured by another analyzer (HORIBA, Ltd.: 9500D). The conversion rate (%) of $NH_3$ to $N_2$ was calculated on the basis of values obtained by the analyzers in a similar manner to the cases of the oxidation catalysts A to D described above. Table 3 below shows the results.

TABLE 3

Conversion Rate (%) of $NH_3$ to $N_2$ in Each of Examples and Comparative Examples

| No. | Conversion Rate at 306° C. | Conversion Rate at 409° C. |
|---|---|---|
| Example 1 | 80.2 | 73.2 |
| Example 2 | 85.1 | 89.4 |
| Example 3 | 79.5 | 86.9 |
| Comparative Example 1 | 60.5 | 48.2 |
| Comparative Example 2 | 83.0 | 62.4 |

As it is clear from the results in Table 3, Comparative Example 1 carrying Pt in the pre-stage section of the oxidation catalyst exhibited the lowest purification activity of $NH_3$ at both a low temperature of 306° C. and a high temperature of 409° C. Such a result was obtained because Pt having a high oxidation activity was disposed in the pre-stage of the oxidation catalyst and a large part of $NH_3$ in the exhaust gas was thus oxidized to nitrogen oxides (NOx) such as NO, $NO_2$, and $N_2O$ instead of $N_2$. On the other hand, Comparative Example 2 where the air-fuel ratio control by the exhaust gas control apparatus of the present invention was not performed exhibited a considerably low $NH_3$ purification activity at the high temperature of 409° C. This result was obtained because appropriate air-fuel ratio control was not performed in Comparative Example 2 in spite of using the same oxidation catalyst as Example 2, oxidation of $NH_3$ to NOx was facilitated at the high temperature of 409° C., and as a result the conversion rate of $NH_3$ to $N_2$ largely decreased.

In contrast to the comparative examples, as shown by Examples 1 to 3, the exhaust gas control apparatus in accordance with the present invention provided high conversion rates of $NH_3$ to $N_2$ at both the temperatures of 306° C. and 409° C. In other words, $NH_3$ in the exhaust gas was selectively oxidized and decomposed to $N_2$. That is, according to the exhaust gas control apparatus for an internal combustion engine of the present invention, the air-fuel ratio of the exhaust gas flowing into the oxidation catalyst is appropriately controlled in response to the temperature of the oxidation catalyst. Accordingly, in the entire temperature range where the oxidation catalyst is exposed, $NH_3$ contained in the exhaust gas can be selectively oxidized to $N_2$ instead of nitrogen oxides (NOx) such as NO and $NO_2$ according to operating conditions or the like of the NOx purification catalyst; therefore allowing an improvement in reduction in deterioration of exhaust emission. Further, in Examples 2 and 3 where Pt was further carried on the post-stage section of the oxidation catalyst, a high conversion rate of $NH_3$ to $N_2$ was achieved particularly at the high temperature of 409° C. compared to Example 1 where Pt was not carried thereon. In other words, according to preferable embodiments of the exhaust gas control apparatus for an internal combustion engine of the present invention, at least one of Cu and Fe is carried on both the pre-stage and post-stage sections of the oxidation catalyst, and at least one of Pt, Pd, and Ag is carried only on the post-stage section of the oxidation catalyst. Accordingly, $NH_3$ in the exhaust gas can be selectively oxidized to $N_2$ instead of NOx by Cu and/or Fe, and unreacted $NH_3$ can be certainly oxidized and purified by Pt, Pd, and/or Ag carried on the post-stage section of the oxidation catalyst. Further, Pt, Pd, and Ag have very high oxidation activities to HC and CO in the exhaust gas. Therefore, use of these metals in the post-stage section of the oxidation catalyst allows certain oxidation and purification of HC and CO in the exhaust gas.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. An exhaust gas control apparatus for an internal combustion engine, the exhaust gas control apparatus comprising:
    a NOx purification catalyst which is disposed in an exhaust passage of the internal combustion engine and is formed to carry a first catalyst metal on a first catalyst carrier;
    an oxidation catalyst which is disposed downstream of the NOx purification catalyst in the exhaust passage and is formed to carry second catalyst metals including a base metal on a second catalyst carrier;
    an air introduction apparatus that introduces air into the exhaust passage downstream of the NOx purification catalyst and upstream of the oxidation catalyst in the exhaust passage;
    a temperature detector that detects a temperature of the oxidation catalyst; and
    a controller configured to
        when the temperature of the oxidation catalyst detected by the temperature detector is a predetermined temperature or lower, adjust an air amount introduced into the exhaust passage by the air introduction apparatus to control an air-fuel ratio of the exhaust gas flowing into the oxidation catalyst to a more fuel lean air-fuel ratio than a stoichiometric air-fuel ratio, and when the temperature of the oxidation catalyst detected by the temperature detector exceeds the predetermined temperature, adjust the air amount introduced into the exhaust passage by the air introduction apparatus to control the air-fuel ratio of the exhaust gas flowing into the oxidation catalyst to the stoichiometric air-fuel ratio.

2. The exhaust gas control apparatus for an internal combustion engine according to claim 1, wherein the oxidation catalyst is formed with a pre-stage section in an upstream side in a flow direction of the exhaust gas and a post-stage section in a downstream side in the flow direction of the exhaust gas, the second catalyst metals further include at least one of Pt, Pd, and Ag, the base metal is carried on both of the pre-stage section and the post-stage section, and at least one of Pt, Pd, and Ag is carried only on the post-stage section.

3. The exhaust gas control apparatus for an internal combustion engine according to claim 1, wherein the second catalyst carrier is selected from the group consisting of alumina, zeolite, titania and combinations thereof.

4. The exhaust gas control apparatus for an internal combustion engine according to claim 1, further comprising an oxygen sensor disposed downstream of the oxidation catalyst in the exhaust passage, wherein the controller adjusts the air amount introduced into the exhaust passage by the air introduction apparatus according to an output value of the oxygen sensor to control the air-fuel ratio of the exhaust gas flowing into the oxidation catalyst.

5. The exhaust gas control apparatus for an internal combustion engine according to claim 1, further comprising an air-fuel ratio sensor disposed downstream of the oxidation catalyst in the exhaust passage, wherein the controller adjusts the air amount introduced into the exhaust passage by the air introduction apparatus according to an output value of the air-fuel ratio sensor to control the air-fuel ratio of the exhaust gas flowing into the oxidation catalyst.

6. The exhaust gas control apparatus for an internal combustion engine according to claim 1, wherein the predetermined temperature is 350° C.

7. The exhaust gas control apparatus for an internal combustion engine according to claim 1, wherein an air-fuel ratio of the exhaust gas flowing into the NOx purification catalyst is a more fuel rich air-fuel ratio than the stoichiometric air-fuel ratio.

8. The exhaust gas control apparatus for an internal combustion engine according to claim 1, wherein an air-fuel ratio of the exhaust gas flowing into the NOx purification catalyst is alternated between a more fuel rich air-fuel ratio than the stoichiometric air-fuel ratio and a more fuel lean air-fuel ratio than the stoichiometric air-fuel ratio.

9. The exhaust gas control apparatus for an internal combustion engine according to claim 1, wherein the base metal is selected from the group consisting of Cu, Fe, Ni, Cr, Ce, Co, Mg, Zn, and combinations thereof.

10. The exhaust gas control apparatus for an internal combustion engine according to claim 9, wherein the base metal is selected from the group consisting of Cu, Fe, and a combination thereof.

11. The exhaust gas control apparatus for an internal combustion engine according to claim 1, wherein the first catalyst metal is selected from the group consisting of Cu, Fe, Ni, Mn, Pt, Pd, Rh, Au, and combinations thereof.

12. The exhaust gas control apparatus for an internal combustion engine according to claim 11, wherein the first catalyst metal is Cu.

* * * * *

UNITED STATES PATENT AND TRADEMARK OFFICE
CERTIFICATE OF CORRECTION

| | | |
|---|---|---|
| PATENT NO. | : 9,163,540 B2 | Page 1 of 1 |
| APPLICATION NO. | : 14/347860 | |
| DATED | : October 20, 2015 | |
| INVENTOR(S) | : Takeshi Nobukawa | |

It is certified that error appears in the above-identified patent and that said Letters Patent is hereby corrected as shown below:

On the title page, Item (73), the Assignee's Information is incorrect. Item (73) should read:

--(73)  Assignee:  TOYOTA JIDOSHA KABUSHIKI KAISHA, Toyota-shi (JP)--

Signed and Sealed this
Twenty-second Day of March, 2016

Michelle K. Lee
*Director of the United States Patent and Trademark Office*